United States Patent
Lin et al.

(10) Patent No.: US 11,081,968 B2
(45) Date of Patent: Aug. 3, 2021

(54) ISOLATED BOOST CONVERTER

(71) Applicant: DELTA ELECTRONICS, INC., Taoyuan (TW)

(72) Inventors: Hung-Chieh Lin, Taoyuan (TW); Chao-Li Kao, Taoyuan (TW); Yi-Ping Hsieh, Taoyuan (TW); Jin-Zhong Huang, Taoyuan (TW); Chao-Lung Kuo, Taoyuan (TW); Hung-Yu Huang, Taoyuan (TW); Chih-Hsien Li, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 68 days.

(21) Appl. No.: 16/698,764

(22) Filed: Nov. 27, 2019

(65) Prior Publication Data
US 2020/0395861 A1  Dec. 17, 2020

Related U.S. Application Data

(60) Provisional application No. 62/860,650, filed on Jun. 12, 2019.

(51) Int. Cl.
*H02M 3/335* (2006.01)

(52) U.S. Cl.
CPC ... *H02M 3/33592* (2013.01); *H02M 3/33553* (2013.01); *H02M 3/33584* (2013.01)

(58) Field of Classification Search
CPC ........ H02M 7/066; H02M 7/103; H02M 7/10; H02M 7/219; H02M 7/19; H02M 7/25; H02M 2007/2195
See application file for complete search history.

(56) References Cited

U.S. PATENT DOCUMENTS

| | | | | |
|---|---|---|---|---|
| 3,478,258 A | * | 11/1969 | Nagai | H02M 7/25 363/62 |
| 3,579,078 A | * | 5/1971 | Cronin | H02M 3/337 363/17 |
| 4,167,777 A | * | 9/1979 | Allington | G05F 1/455 363/61 |
| 4,454,455 A | * | 6/1984 | Matulevich | H02M 7/19 318/71 |
| 4,660,134 A | * | 4/1987 | Geray | H02M 7/10 363/131 |
| 4,675,795 A | * | 6/1987 | Takamura | H02M 7/103 363/61 |

(Continued)

*Primary Examiner* — Yusef A Ahmed
(74) *Attorney, Agent, or Firm* — Chun-Ming Shih; HDLS IPR Services

(57) ABSTRACT

An isolated boost converter includes a transformer, a first bridge arm, a second bridge arm, and a boost circuit. The transformer includes a secondary side having a secondary side first contact and a secondary side second contact. The boost circuit includes two diodes—anodes of the two diodes are mutually coupled to a first contact and cathodes of the two diodes are coupled to a first bridge arm upper contact and a second bridge arm upper contact, two diodes—cathodes of the two diodes are mutually coupled to a second contact and anodes of the two diodes are coupled to a first bridge arm lower contact and a second bridge arm lower contact, the second contact is coupled to the first contact, and at least two capacitors are coupled to the secondary side first contact and the secondary side second contact.

10 Claims, 21 Drawing Sheets

(56) References Cited

U.S. PATENT DOCUMENTS

| | | | | |
|---|---|---|---|---|
| 4,839,786 A * | 6/1989 | Ohosuga | ............... | H02M 7/10 361/111 |
| 5,663,877 A * | 9/1997 | Dittli | ............... | H02M 3/33592 363/127 |
| 5,856,916 A * | 1/1999 | Bonnet | ............... | H02M 3/335 363/20 |
| 5,883,795 A * | 3/1999 | Farrington | ........ | H02M 3/33538 363/21.04 |
| 5,956,243 A * | 9/1999 | Mao | ............... | H02M 7/25 363/61 |
| 6,154,382 A * | 11/2000 | Kawahara | ............ | H02M 7/103 363/61 |
| 6,272,031 B1 * | 8/2001 | Shona | ............... | H02M 7/103 363/61 |
| 8,009,444 B2 * | 8/2011 | Duan | ............... | H02M 3/33569 363/21.04 |
| 8,885,366 B2 * | 11/2014 | Yu | ............... | H02M 3/337 363/24 |
| 9,356,522 B2 * | 5/2016 | Hong | ............... | H02M 1/42 |
| 9,692,313 B1 * | 6/2017 | Isurin | ............... | H02M 7/4807 |
| 2004/0047165 A1 * | 3/2004 | Luo | ............... | H02M 7/538 363/25 |
| 2004/0264224 A1 * | 12/2004 | Jang | ............... | H02M 3/3376 363/97 |
| 2008/0316775 A1 * | 12/2008 | Tsai | ............... | H02M 7/217 363/21.01 |
| 2009/0213625 A1 * | 8/2009 | Adler | ............... | H02M 7/10 363/65 |
| 2009/0219006 A1 * | 9/2009 | Gekinozu | ............ | H02M 3/1582 323/304 |
| 2011/0013436 A1 * | 1/2011 | Gan | ............... | H02M 1/4208 363/126 |
| 2011/0242853 A1 * | 10/2011 | Agarwal | ............ | H02M 7/103 363/16 |
| 2012/0294053 A1 * | 11/2012 | Yan | ............... | H02M 1/32 363/53 |
| 2013/0003427 A1 * | 1/2013 | Pan | ............... | H02M 1/4208 363/44 |
| 2013/0322136 A1 * | 12/2013 | Ceu | ............... | H02M 7/5387 363/40 |
| 2015/0016164 A1 * | 1/2015 | Takajou | ............ | H04N 1/00899 363/84 |
| 2015/0102765 A1 * | 4/2015 | Lee | ............... | H02J 7/02 320/107 |
| 2015/0131330 A1 * | 5/2015 | Pan | ............... | H02M 3/3584 363/17 |
| 2016/0190933 A1 * | 6/2016 | Lee | ............... | H02M 3/3378 363/17 |
| 2016/0233406 A1 * | 8/2016 | Kurikuma | ............ | H01L 41/125 |
| 2016/0307086 A1 * | 10/2016 | Nozoe | ............... | G06K 19/0715 |
| 2017/0126136 A1 * | 5/2017 | Nakahori | ............ | H02M 3/33507 |
| 2018/0287504 A1 * | 10/2018 | Parsekar | ............ | H02M 5/42 |
| 2018/0335714 A1 * | 11/2018 | Hirabayashi | ......... | H02M 3/155 |
| 2020/0287461 A1 * | 9/2020 | Zou | ............... | H02M 3/158 |

* cited by examiner ical Field

ISOLATED BOOST CONVERTER

CROSS-REFERENCE TO RELATED APPLICATION

This patent application claims the benefit of U.S. Provisional Patent Application No. 62/860,650 filed Jun. 12, 2019 which is incorporated by reference herein.

BACKGROUND

Technical Field

The present disclosure relates to an isolated boost converter, and more particularly to an isolated boost converter with a high boost ratio.

Description of Related Art

The statements in this section merely provide background information related to the present disclosure and do not necessarily constitute prior art.

Please refer to FIG. 1, which shows a circuit block diagram of a conventional non-isolated boost converter. If a high voltage conversion ratio (boost ratio) is required, for example more than 10 times, two or more than two boost (DC-to-DC) converters are used to implement the requirement of high boost ratio. As shown in FIG. 1, a first DC boost converter and a second DC boost converter are used. In which, a voltage gain of one of the boost converters is about 4. However, disadvantages of the common non-isolated boost converters are higher circuit component costs and lower conversion efficiency.

Please refer to FIG. 2, which shows a circuit diagram of a conventional push-pull converter. The push-pull converter has an advantage of electrical isolation by an isolated transformer. By adjusting the number of coil turns of the isolated transformer, the high boost ratio (voltage conversion ratio) of the push-pull converter can be implemented. For example, a 380-volt output voltage can be achieved by converting a 40- to 60-volt input voltage with the adjusted coil turns. If the voltage conversion ratio is too high, however, excessive number of the secondary-side coil turns causes an increase in the leakage inductance of the isolated transformer, resulting in higher stress on the switch and/or the diode. Further, the components with higher rated voltage need to be used and the turned-on resistance of the switch becomes larger cause increased circuit costs, reduced efficiency, and larger transformer volume.

Please refer to FIG. 3, which shows a circuit diagram of a conventional half-bridge converter. It's similar to the push-pull converter shown in FIG. 2, including the change of the voltage conversion ration by adjusting the transformer, and the disadvantages of the push-pull converter. Moreover, the push-pull converter shown in FIG. 2 and the half-bridge converter shown in FIG. 3 both use hard switching of the switches and the first- and third-quadrant operations of the transformers. The quadrant here refers to the main operation area of the transformer in the B-H curve (hysteresis phenomenon is ignored).

Please refer to FIG. 4 and FIG. 5, which show circuit diagrams of a conventional full-bridge LLC resonant converter and a conventional half-bridge LLC resonant converter, respectively. The switches of the two kind of LLC resonant converters can operate under ZVS (zero voltage switching) condition. By adjusting the number of coil turns of the isolated transformer, the high voltage conversion ratio of the LLC resonant converter can be implemented. If the voltage conversion ratio is too high, however, excessive number of the coil turns causes the increased coil turns of the transformer, increased volume of the transformer, and reduced efficiency. Moreover, the full-bridge LLC resonant converter shown in FIG. 4 and the half-bridge LLC resonant converter shown in FIG. 5 provide the first- and third-quadrant operations of the transformers.

Please refer to FIG. 6, which shows a circuit diagram of a conventional full-bridge converter. The switches of the full-bridge converter can operate under ZVS condition by phase control techniques. In order to implement the high boost ratio (voltage conversion ratio), however, the excessive number of the coil turns causes larger transformer volume, higher stress of the semiconductor switch, and lower conversion efficiency.

In the above several common isolated converters, the isolated transformer thereof operate in the first quadrant and the third quadrant. The present disclosure proposes an isolated converter with high boost ratio that can operate in the first quadrant and the third quadrant. The high boost ratio of the isolated converter can be implemented by charging capacitors to establish a high output voltage, thereby effectively reducing the number of coil turns of the isolated transformer. Accordingly, it is to increase efficiency of the boost circuit, reduce circuit component costs, and reduce occupied volume due to the reduction of the number of coil turns of the isolated transformer.

SUMMARY

In order to solve the above-mentioned problems, an isolated boost converter is provided. The isolated boost converter includes a transformer, a first bridge arm, a second bridge arm, and a boost circuit. The transformer includes a secondary side having a secondary side first contact and a secondary side second contact. The first bridge arm has a first diode and a second diode; a cathode of the first diode is coupled to a DC positive output contact, an anode of the first diode is coupled to a first bridge arm upper contact, an anode of the second diode is coupled to a DC negative output contact, and a cathode of the second diode is coupled to a first bridge arm lower contact. The second bridge arm has a third diode and a fourth diode; a cathode of the third diode is coupled to the DC positive output contact, an anode of the third diode is coupled to a second bridge arm upper contact, an anode of the fourth diode is coupled to the DC negative output contact, and a cathode of the fourth diode is coupled to a second bridge arm lower contact. The boost circuit includes four diodes and at least two capacitors. Anodes of the two diodes are mutually coupled to a first contact and cathodes of the two diodes are coupled to the first bridge arm upper contact and the second bridge arm upper contact, respectively. Cathodes of the two diodes are mutually coupled to a second contact and anodes of the two diodes are coupled to the first bridge arm lower contact and the second bridge arm lower contact, and the second contact is coupled to the first contact. The at least two capacitors are coupled to the secondary side first contact and the secondary side second contact.

Accordingly, the isolated boost converter is provided to increase efficiency of the boost circuit, reduce circuit component costs, and reduce occupied volume due to the reduction of the number of coil turns of the isolated transformer.

In order to solve the above-mentioned problems, an isolated boost converter is provided. The isolated boost converter includes a first bridge arm, a second bridge arm, and a boost circuit. The transformer includes a secondary side having a secondary side first contact, a secondary side second contact, and a center-tapped contact. The first bridge arm has a first diode and a second diode; a cathode of the first diode is coupled to a DC positive output contact, an anode of the first diode is coupled to a first bridge arm upper contact, an anode of the second diode is coupled to a DC negative output contact, and a cathode of the second diode is coupled to a first bridge arm lower contact. The second bridge arm has a third diode and a fourth diode; a cathode of the third diode is coupled to the DC positive output contact, an anode of the third diode is coupled to a second bridge arm upper contact, an anode of the fourth diode is coupled to the DC negative output contact, and a cathode of the fourth diode is coupled to a second bridge arm lower contact. The boost circuit include four diodes and four capacitors. Anodes of the two diodes are mutually coupled to a first contact and cathodes of the two diodes are coupled to the first bridge arm upper contact and the second bridge arm upper contact, respectively. Cathodes of the two diodes are mutually coupled to a second contact and anodes of the two diodes are coupled to the first bridge arm lower contact and the second bridge arm lower contact, and the second contact is coupled to the first contact and the center-tapped contact. The four capacitors are coupled to the secondary side first contact and the secondary side second contact.

Accordingly, the isolated boost converter is provided to increase efficiency of the boost circuit, reduce circuit component costs, and reduce occupied volume due to the reduction of the number of coil turns of the isolated transformer.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
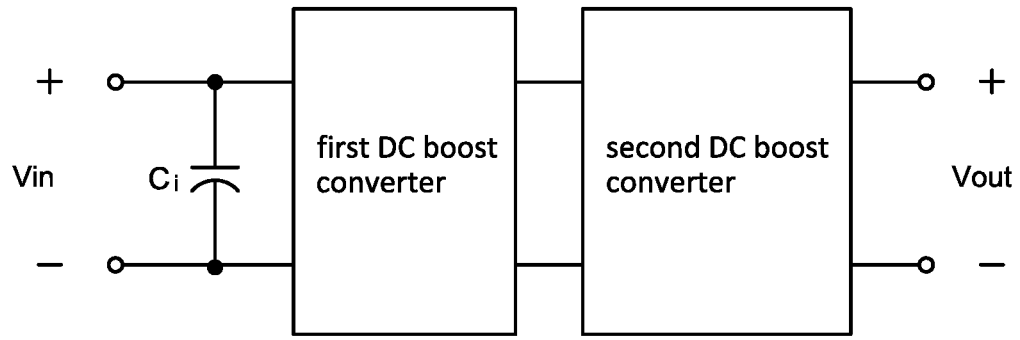
FIG. 1 is a circuit block diagram of a conventional non-isolated boost converter.
Figure 2:
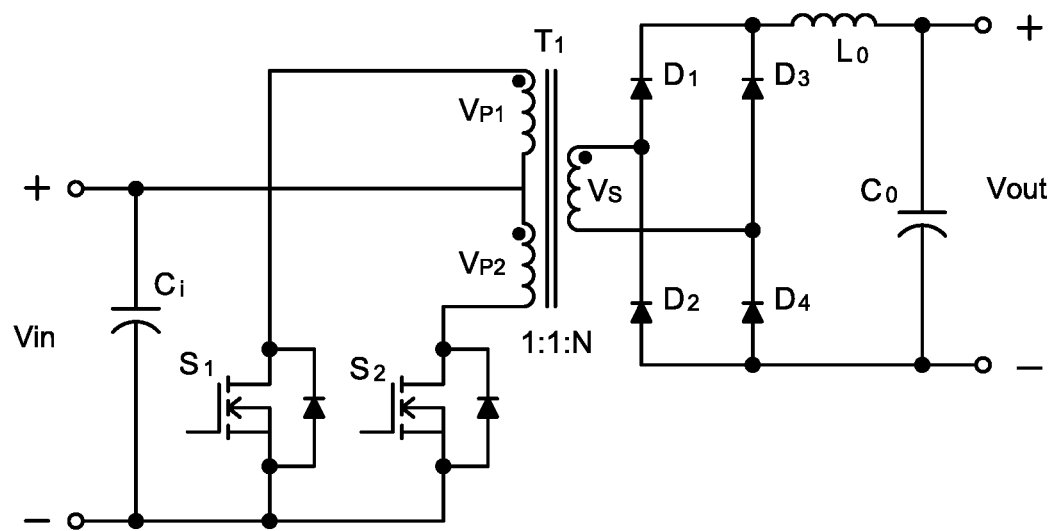
FIG. 2 is a circuit diagram of a conventional push-pull converter.
Figure 3:
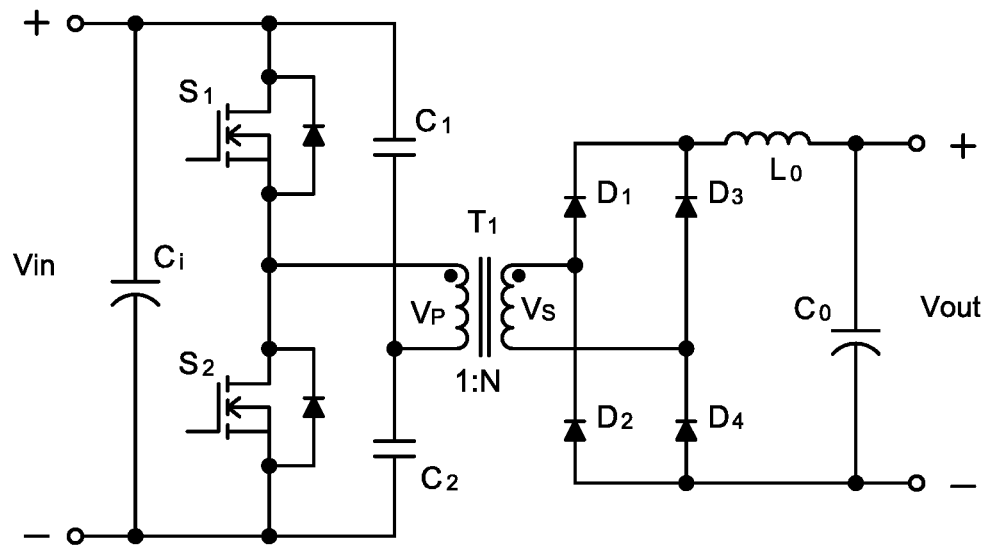
FIG. 3 is a circuit diagram of a conventional half-bridge converter.
Figure 4:
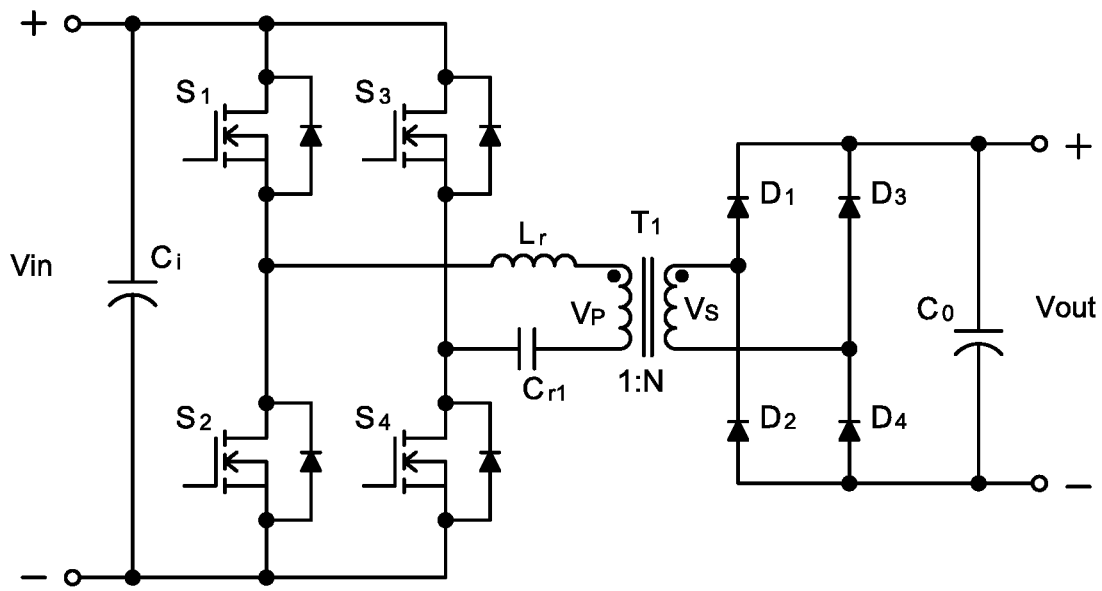
FIG. 4 is a circuit diagram of a conventional full-bridge LLC resonant converter.
Figure 5:
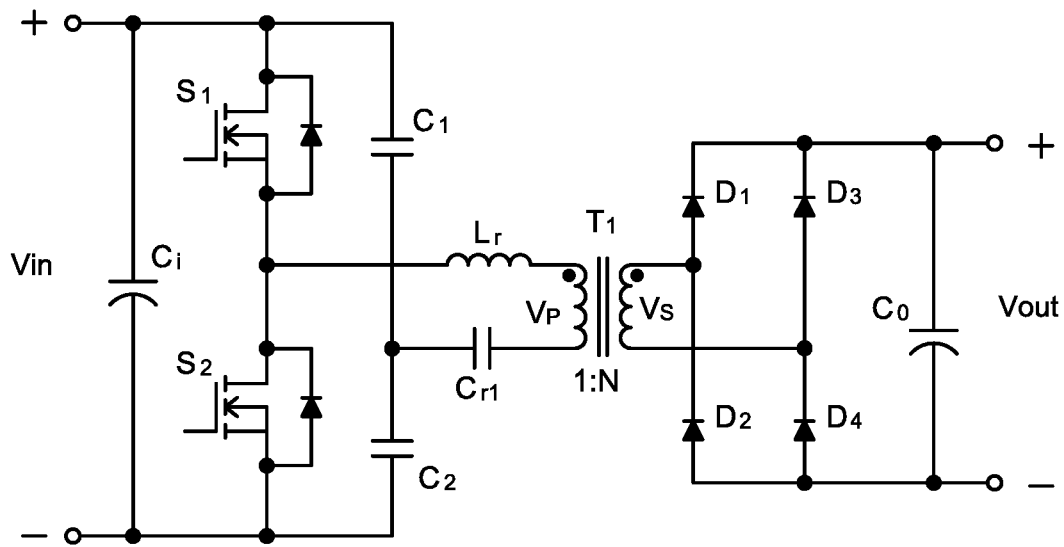
FIG. 5 is a circuit diagram of a conventional half-bridge LLC resonant converter.
Figure 6:
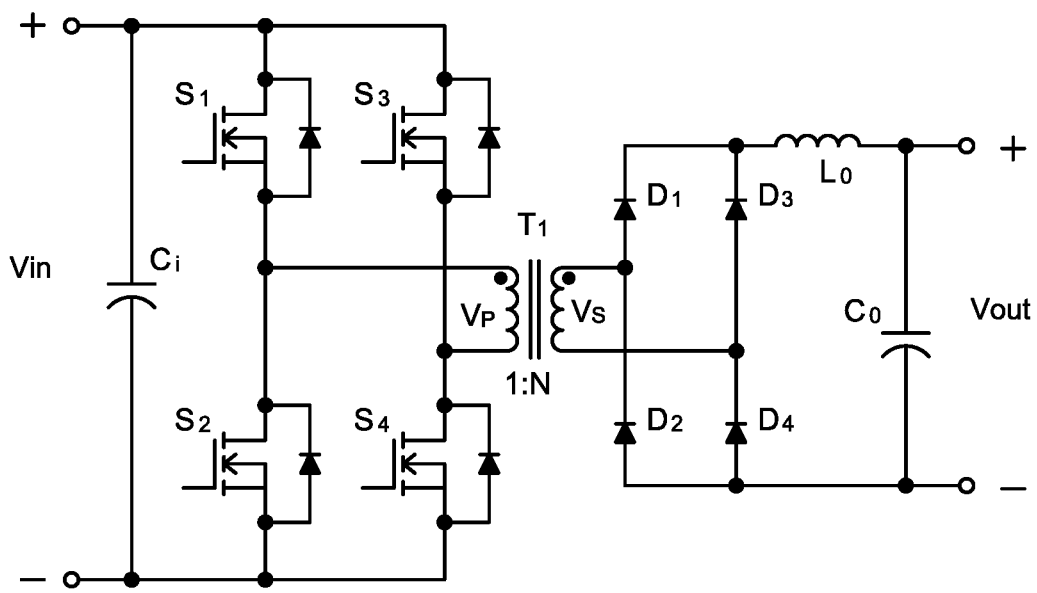
FIG. 6 is a circuit diagram of a conventional full-bridge converter.

Reference will now be made to the drawing figures to describe the present disclosure in detail. It will be understood that the drawing figures and exemplified embodiments of present disclosure are not limited to the details thereof.

Figure 7:
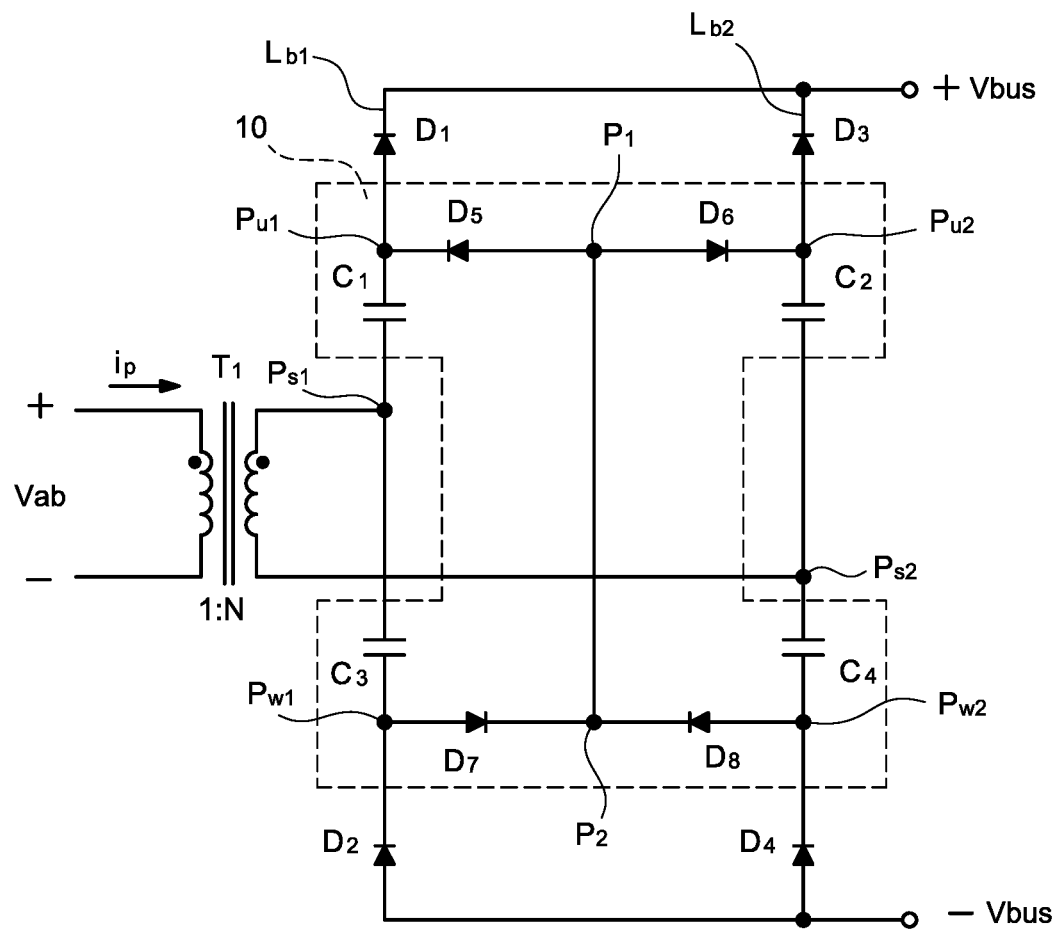
FIG. 7 is a single-bus circuit structure of boosting voltage of an isolated boost converter according to a first embodiment of the present disclosure.

Please refer to FIG. 7, which shows a single-bus circuit structure of boosting voltage of an isolated boost converter according to a first embodiment of the present disclosure. The isolated boost converter includes a transformer T1, a first bridge arm Lb1, a second bridge arm Lb2, and a boost circuit 10. The transformer T1 includes a secondary side having a secondary side first contact Ps1 and a secondary side second contact Ps2. The first bridge arm Lb1 has a first diode D1 and a second diode D2. A cathode of the first diode D1 is coupled to a DC positive output contact +Vbus, an anode of the first diode D1 is coupled to a first bridge arm upper contact Pu1, an anode of the second diode D2 is coupled to a DC negative output contact −Vbus, and a cathode of the second diode D2 is coupled to a first bridge arm lower contact Pw1. The second bridge arm Lb2 has a third diode D3 and a fourth diode D4. A cathode of the third diode D3 is coupled to the DC positive output contact +Vbus, an anode of the third diode D3 is coupled to a second bridge arm upper contact Pu2, an anode of the fourth diode D4 is coupled to the DC negative output contact −Vbus, and a cathode of the fourth diode D4 is coupled to a second bridge arm lower contact Pw2.

The boost circuit 10 includes two diodes D5, D6 that are mutually coupled by their anodes, two diodes D7, D8 that are mutually coupled by their cathodes, and at least two capacitors C1-C4. Specifically, the anodes of the diodes D5, D6 are coupled to a first contact P1, and cathodes of the diodes D5, D6 are coupled to the first bridge arm upper contact Pu1 and the second bridge arm upper contact Pu2, respectively. The cathodes of the diodes D7, D8 are coupled to a second contact P2, and anodes of the diodes D7, D8 are coupled to the first bridge arm lower contact Pw1 and the second bridge arm lower contact Pw2, respectively. The second contact P2 is coupled to the first contact P1. The at least two capacitors C1-C4 are coupled to the secondary side first contact Ps1 and the secondary side second contact Ps2.

As shown in FIG. 7, the number of the at least two capacitors C1-C4 is four, including a first capacitor C1, a second capacitor C2, a third capacitor C3, and a fourth capacitor C4. Two ends of the first capacitor C1 are coupled to the secondary side first contact Ps1 and the first bridge arm upper contact Pu1. Two ends of the second capacitor C2 are coupled to the secondary side second contact Ps2 and the second bridge arm upper contact Pu2. Two ends of the third capacitor C3 are coupled to the secondary side first contact Ps1 and the first bridge arm lower contact Pw1. Two ends of the fourth capacitor C4 are coupled to the secondary side second contact Ps2 and the second bridge arm lower contact Pw2. For the boost circuit 10 shown in FIG. 7, the boost circuit 10 is a symmetrical circuit along a reference line which is the connection between the first contact P1 and the second contact P2.

The symmetrical diode-capacitor circuit, which is coupled to the secondary side of the transformer T1, is proposed to charge the capacitors through the secondary side coil turns, thereby reducing coil turns, increasing conversion efficiency, and reducing occupied volume. Further, the symmetrical diode-capacitor circuit can be used in a variety of isolated converters capable of operating both in a first quadrant and a third quadrant.

Figure 8A:
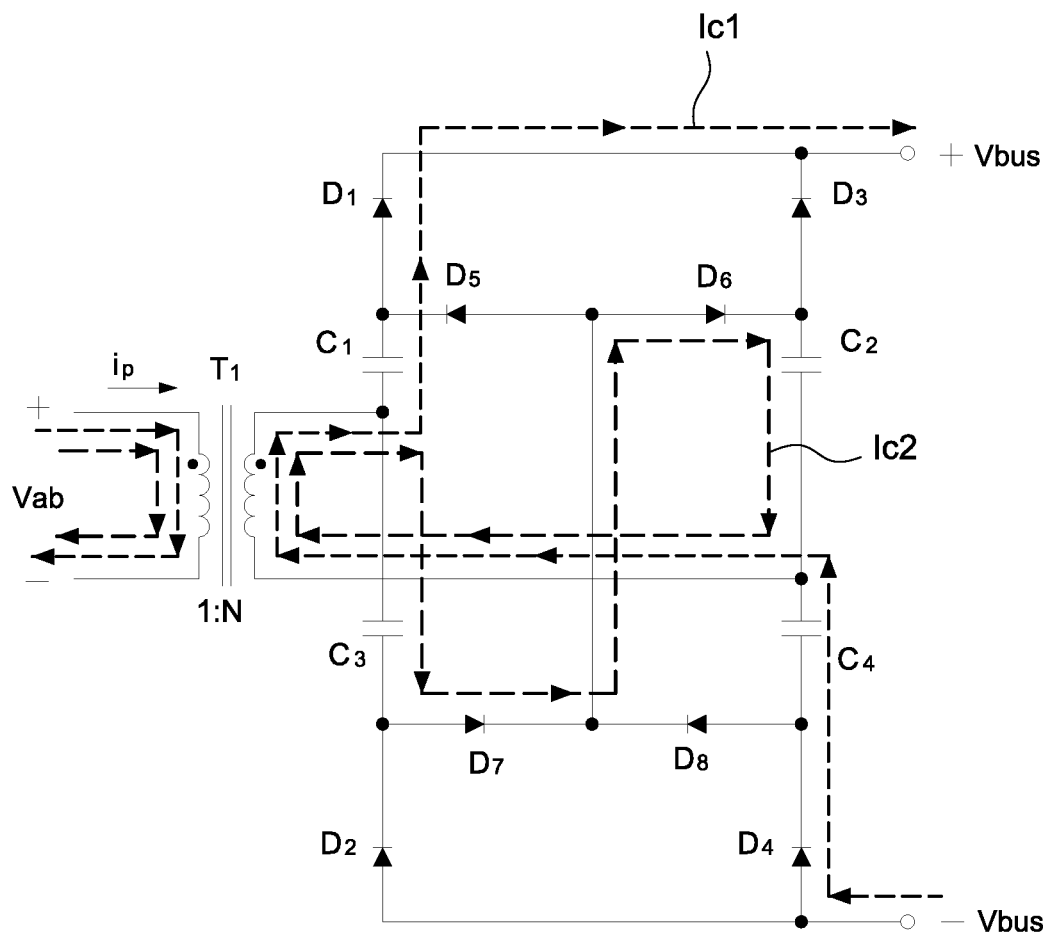
FIG. 8A is a schematic diagram of current paths of a first-quadrant operation in FIG. 7.

Please refer to FIG. 8A, which shows a schematic diagram of current paths of a first-quadrant operation in FIG. 7. When the isolated boost converter operates in the first quadrant, a main current Ic1 flows through the secondary side of the transformer T1, the first capacitor C1, the first diode D1, the DC positive output contact +Vbus, the DC negative output contact −Vbus, the fourth diode D4, the fourth capacitor C4, and the secondary side. At this condition, the secondary side of the transformer T1 are connected in series to the first capacitor C1 and the fourth capacitor C4 to establish a high output voltage. In particular, the first capacitor C1 and the fourth capacitor C4 are equivalent to be connected in series since the first diode D1 and the fourth diode D4 are turned by forward bias voltages.

A pre-charge current Ic2 flows through the secondary side of the transformer T1, the third capacitor C3, a seventh diode D7, a sixth diode D6, the second capacitor C2, and the secondary side. The second capacitor C2 and the third capacitor C3 are charged by the pre-charge current Ic2. In particular, since the sixth diode D6 and the seventh diode D7 are turned on by forward bias voltages, the second capacitor C2 and the third capacitor C3 are equivalent to be connected in series.

Figure 8B:
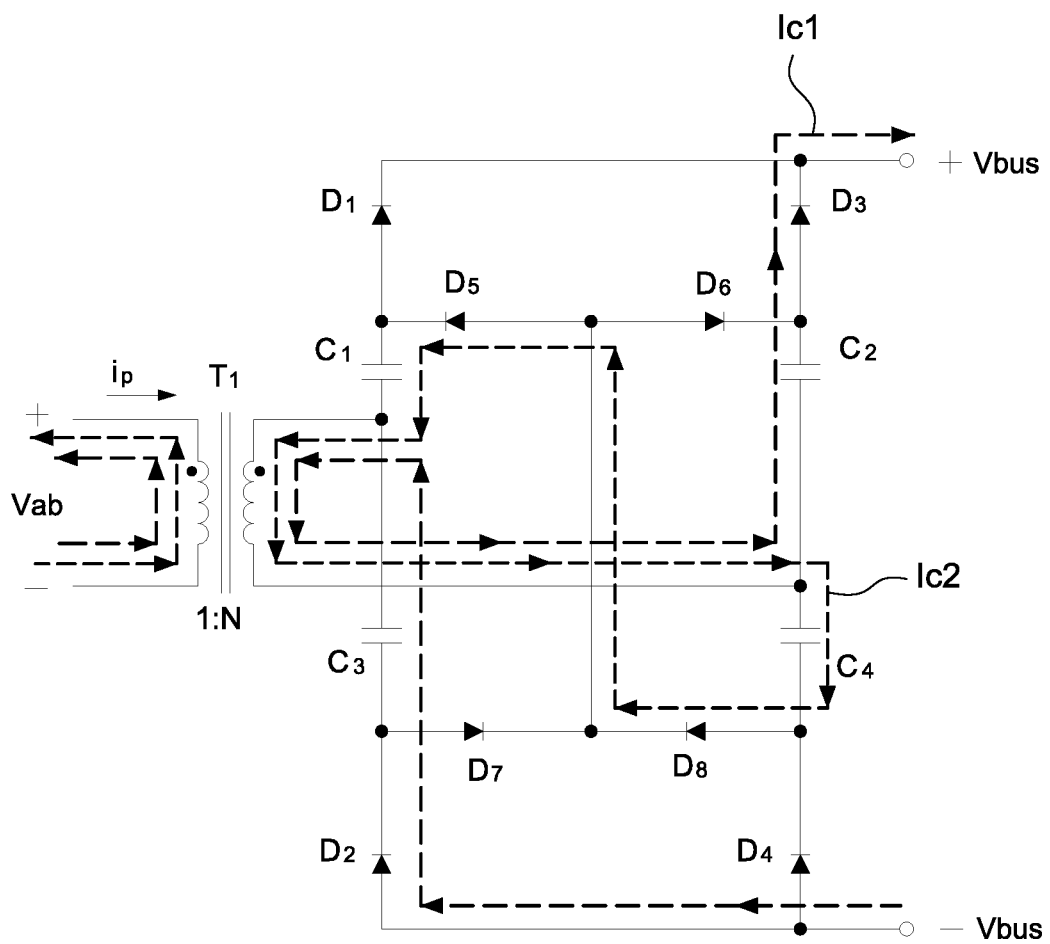
FIG. 8B is a schematic diagram of current paths of a third-quadrant operation in FIG. 7.

Please refer to FIG. 8B, which shows a schematic diagram of current paths of a third-quadrant operation in FIG. 7. When the isolated boost converter operates in the third quadrant, a main current Ic1 flows through the secondary side of the transformer T1, the second capacitor C2, the third diode D3, the DC positive output contact +Vbus, the DC negative output contact −Vbus, the second diode D2, the third capacitor C3, and the secondary side. At this condition, the secondary side of the transformer T1 are connected in series to the second capacitor C2 and the third capacitor C3 to establish a high output voltage. In particular, the second capacitor C2 and the third capacitor C3 are equivalent to be connected in series since the second diode D2 and the third diode D3 are turned by forward bias voltages.

A pre-charge current Ic2 flows through the secondary side of the transformer T1, the fourth capacitor C4, an eighth diode D8, a fifth diode D5, the first capacitor C1, and the secondary side. The first capacitor C1 and the fourth capacitor C4 are charged by the pre-charge current Ic2. In particular, since the fifth diode D5 and the eighth diode D8 are turned on by forward bias voltages, the first capacitor C1 and the fourth capacitor C4 are equivalent to be connected in series.

Figure 9A:
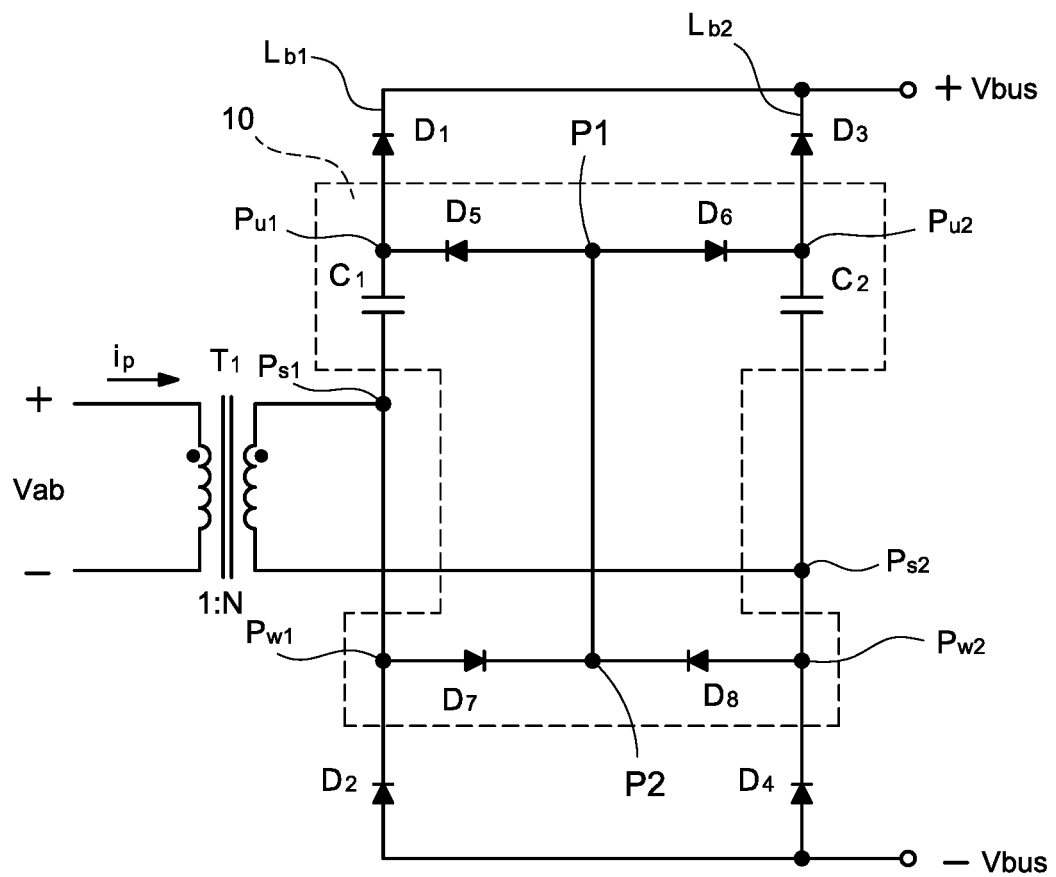
FIG. 9A is a single-bus circuit structure of boosting voltage of the isolated boost converter according to a second embodiment of the present disclosure.

Please refer to FIG. 9A, which shows a single-bus circuit structure of boosting voltage of the isolated boost converter according to a second embodiment of the present disclosure. As shown in FIG. 9A, the number of the at least two capacitors C1-C4 is two, including the first capacitor C1 and the second capacitor C2. Two ends of the first capacitor C1 are coupled to the secondary side first contact Ps1 and the first bridge arm upper contact Pu1. Two ends of the second capacitor C2 are coupled to the secondary side second contact Ps2 and the second bridge arm upper contact Pu2. The secondary side first contact Ps1 is coupled to the first bridge arm lower contact Pw1, and the secondary side second contact Ps2 is coupled to the second bridge arm lower contact Pw2. Similarly, for the boost circuit 10 shown in FIG. 9A, the boost circuit 10 is a symmetrical circuit along a reference line which is the connection between the first contact P1 and the second contact P2. In comparison with the first embodiment shown in FIG. 7, the number of the capacitors shown in FIG. 9A is less than that shown in FIG. 7, that is, the number of capacitors shown in FIG. 9A is half that shown in FIG. 7. Since the first capacitor C1 is coupled to the fourth capacitor C4 in series, the first capacitor C1 is used to replace the in-series first capacitor C1 and fourth capacitor C4. Also, since the second capacitor C2 is coupled to the third capacitor C3 in series, and the second capacitor C2 is used to replace the in-series second capacitor C2 and the third capacitor C3.

As shown in FIG. 9A, when the isolated boost converter operates in the first quadrant, a main current (not shown) flows through the secondary side of the transformer T1, the first capacitor C1, the first diode D1, the DC positive output contact +Vbus, the DC negative output contact −Vbus, the fourth diode D4, and the secondary side; a pre-charge current (not shown) flows through the secondary side of the transformer T1, the seventh diode D7, the sixth diode D6, the second capacitor C2, and the secondary side. When the isolated boost converter operates in the third quadrant, a main current (not shown) flows through the secondary side of the transformer T1, the second capacitor C2, the third diode D3, the DC positive output contact +Vbus, the DC negative output contact −Vbus, the second diode D2, and the secondary side; a pre-charge current (not shown) flows through the secondary side of the transformer T1, the eighth diode D8, the fifth diode D5, the first capacitor C1, and the secondary side.

Figure 9B:
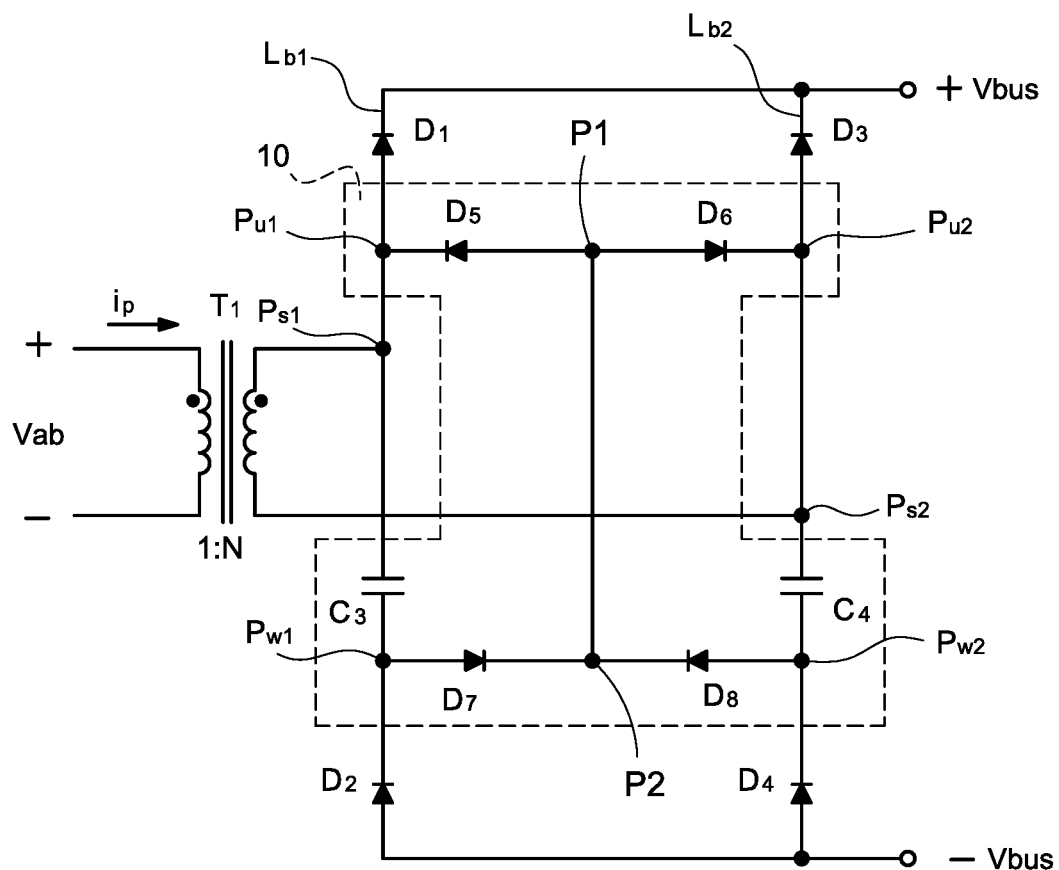
FIG. 9B is a single-bus circuit structure of boosting voltage of the isolated boost converter according to a third embodiment of the present disclosure.

Please refer to FIG. 9B, which shows a single-bus circuit structure of boosting voltage of the isolated boost converter according to a third embodiment of the present disclosure.

As shown in FIG. 9B, the number of the at least two capacitors C1-C4 is two, including the third capacitor C3 and the fourth capacitor C4. Two ends of the third capacitor C3 are coupled to the secondary side first contact Ps1 and the first bridge arm lower contact Pw1. Two ends of the fourth capacitor C4 are coupled to the secondary side second contact Ps2 and the second bridge arm lower contact Pw2. The secondary side first contact Ps1 is coupled to the first bridge arm upper contact Pu1, and the secondary side second contact Ps2 is coupled to the second bridge arm upper contact Pu2. Similarly, for the boost circuit 10 shown in FIG. 9B, the boost circuit 10 is a symmetrical circuit along a reference line which is the connection between the first contact P1 and the second contact P2. In comparison with the first embodiment shown in FIG. 7, the number of the capacitors shown in FIG. 9B is less than that shown in FIG. 7, that is, the number of capacitors shown in FIG. 9B is half that shown in FIG. 7. Since the first capacitor C1 is coupled to the fourth capacitor C4 in series, the fourth capacitor C4 is used to replace the in-series first capacitor C1 and fourth capacitor C4. Also, since the second capacitor C2 is coupled to the third capacitor C3 in series, and the third capacitor C3 is used to replace the in-series second capacitor C2 and the third capacitor C3.

As shown in FIG. 9B, when the isolated boost converter operates in the first quadrant, a main current (not shown) flows through the secondary side of the transformer T1, the first diode D1, the DC positive output contact +Vbus, the DC negative output contact −Vbus, the fourth diode D4, the fourth capacitor C4, and the secondary side; a pre-charge current (not shown) flows through the secondary side of the transformer T1, the third capacitor C3, the seventh diode D7, the sixth diode D6, and the secondary side. When the isolated boost converter operates in the third quadrant, a main current (not shown) flows through the secondary side of the transformer T1, the third diode D3, the DC positive output contact +Vbus, the DC negative output contact −Vbus, the second diode D2, and the third capacitor C3, and the secondary side; a pre-charge current (not shown) flows through the secondary side of the transformer T1, the fourth capacitor C4, the eighth diode D8, the fifth diode D5, and the secondary side.

Figure 10:
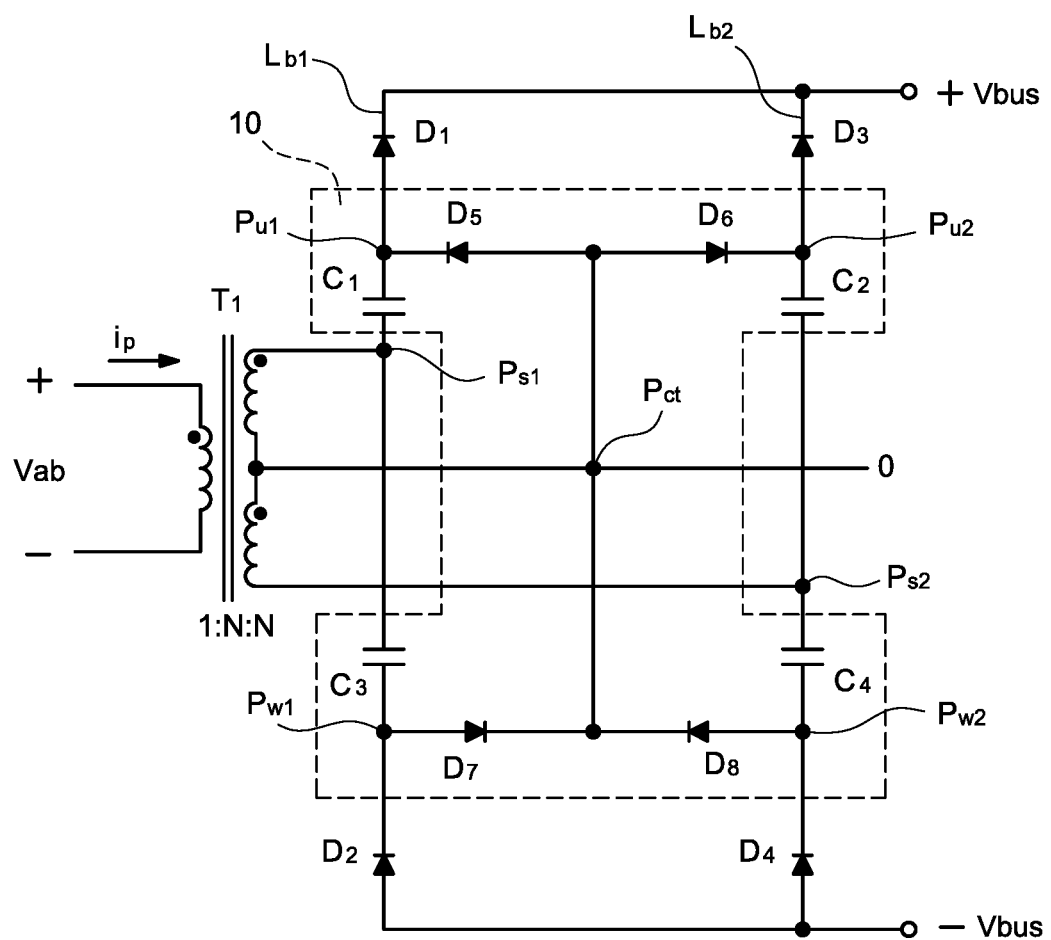
FIG. 10 is a dual-bus circuit structure of boosting voltage of the isolated boost converter according to the present disclosure.

Please refer to FIG. 10, which shows a dual-bus circuit structure of boosting voltage of the isolated boost converter according to the present disclosure. In the same concept of the symmetrical diode-capacitor circuit, the dual-bus circuit structure is proposed for the specific application, such as a dual-bus output of the UPS's power converter. In comparison with the single-bus circuit structure of boosting voltage of the isolated boost converter shown in FIG. 7, the dual-bus circuit structure of boosting voltage of the isolated boost converter shown in FIG. 10 further includes a center-tapped contact Pct. Therefore, balance charging and discharging operation of the dual-bus output voltage can be implemented through the center-tapped structure. Specifically, the isolated boost converter includes a transformer T1, a first bridge arm Lb1, a second bridge arm Lb2, and a boost circuit 10. The transformer T1 includes a secondary side having a secondary side first contact Ps1 and a secondary side second contact Ps2. The first bridge arm Lb1 has a first diode D1 and a second diode D2. A cathode of the first diode D1 is coupled to a DC positive output contact +Vbus, an anode of the first diode D1 is coupled to a first bridge arm upper contact Pu1, an anode of the second diode D2 is coupled to a DC negative output contact −Vbus, and a cathode of the second diode D2 is coupled to a first bridge arm lower contact Pw1. The second bridge arm Lb2 has a third diode D3 and a fourth diode D4. A cathode of the third diode D3 is coupled to the DC positive output contact +Vbus, an anode of the third diode D3 is coupled to a second bridge arm upper contact Pu2, an anode of the fourth diode D4 is coupled to the DC negative output contact −Vbus, and a cathode of the fourth diode D4 is coupled to a second bridge arm lower contact Pw2.

The boost circuit 10 includes two diodes D5, D6 that are mutually coupled by their anodes, two diodes D7, D8 that are mutually coupled by their cathodes, and four capacitors C1-C4. Specifically, the anodes of the diodes D5, D6 are coupled to the center-tapped contact Pct, and cathodes of the diodes D5, D6 are coupled to the first bridge arm upper contact Pu1 and the second bridge arm upper contact Pu2, respectively. The cathodes of the diodes D7, D8 are coupled to the center-tapped contact Pct, and anodes of the diodes D7, D8 are coupled to the first bridge arm lower contact Pw1 and the second bridge arm lower contact Pw2, respectively. The four capacitors C1-C4 are coupled to the secondary side first contact Ps1 and the secondary side second contact Ps2.

As shown in FIG. 10, the number of the at least two capacitors C1-C4 is four, including a first capacitor C1, a second capacitor C2, a third capacitor C3, and a fourth capacitor C4. Two ends of the first capacitor C1 are coupled to the secondary side first contact Ps1 and the first bridge arm upper contact Pu1. Two ends of the second capacitor C2 are coupled to the secondary side second contact Ps2 and the second bridge arm upper contact Pu2. Two ends of the third capacitor C3 are coupled to the secondary side first contact Ps1 and the first bridge arm lower contact Pw1. Two ends of the fourth capacitor C4 are coupled to the secondary side second contact Ps2 and the second bridge arm lower contact Pw2. For the boost circuit 10 shown in FIG. 10, the boost circuit 10 is a symmetrical circuit.

Figure 11A:
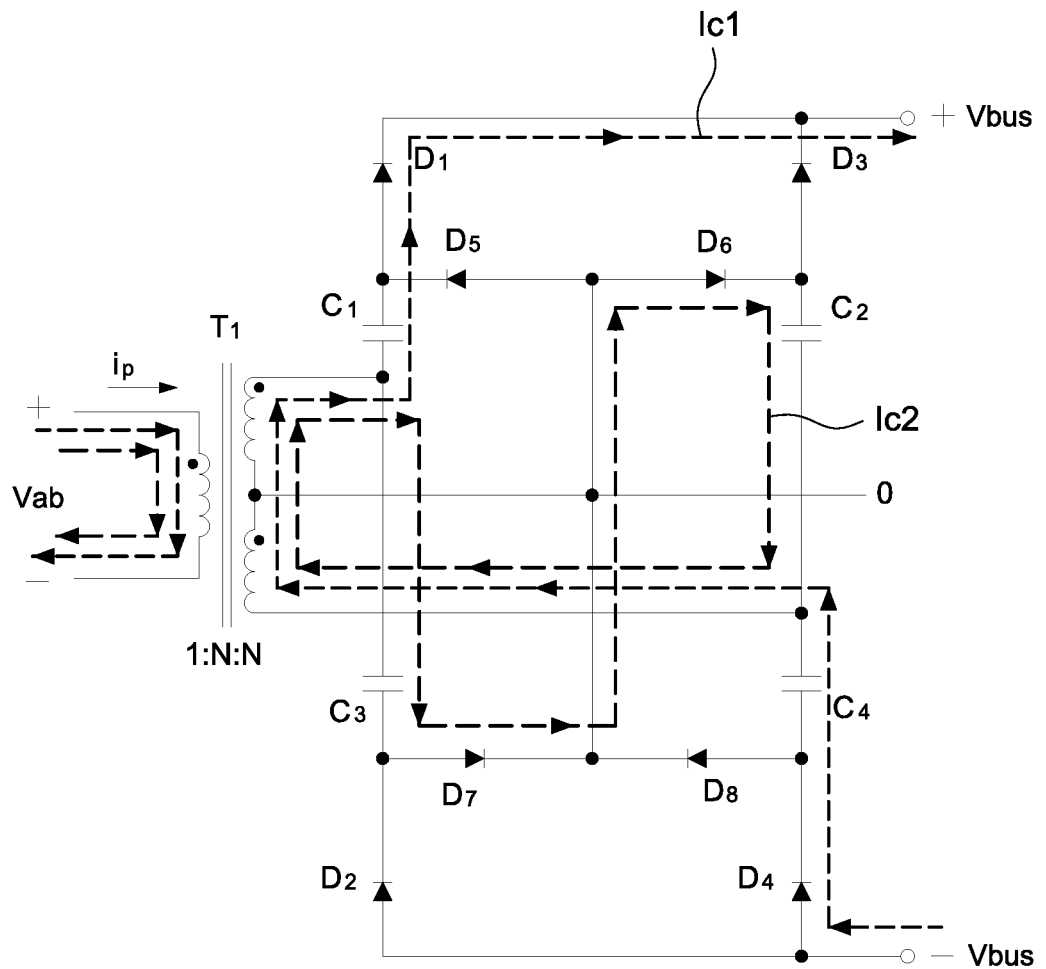
FIG. 11A is a schematic diagram of current paths of a first-quadrant operation in FIG. 10.

Please refer to FIG. 11A, which shows a schematic diagram of current paths of a first-quadrant operation in FIG. 10. When the isolated boost converter operates in the first quadrant, a main current Ic1 flows through the secondary side of the transformer T1, the first capacitor C1, the first diode D1, the DC positive output contact +Vbus, the DC negative output contact −Vbus, the fourth diode D4, the fourth capacitor C4, and the secondary side. At this condition, the secondary side of the transformer T1 are connected in series to the first capacitor C1 and the fourth capacitor C4 to establish a high output voltage. In particular, the first capacitor C1 and the fourth capacitor C4 are equivalent to be connected in series since the first diode D1 and the fourth diode D4 are turned by forward bias voltages.

A pre-charge current Ic2 flows through the secondary side of the transformer T1, the third capacitor C3, a seventh diode D7, a sixth diode D6, the second capacitor C2, and the secondary side. The second capacitor C2 and the third capacitor C3 are charged by the pre-charge current Ic2. In particular, since the sixth diode D6 and the seventh diode D7 are turned on by forward bias voltages, the second capacitor C2 and the third capacitor C3 are equivalent to be connected in series.

Figure 11B:
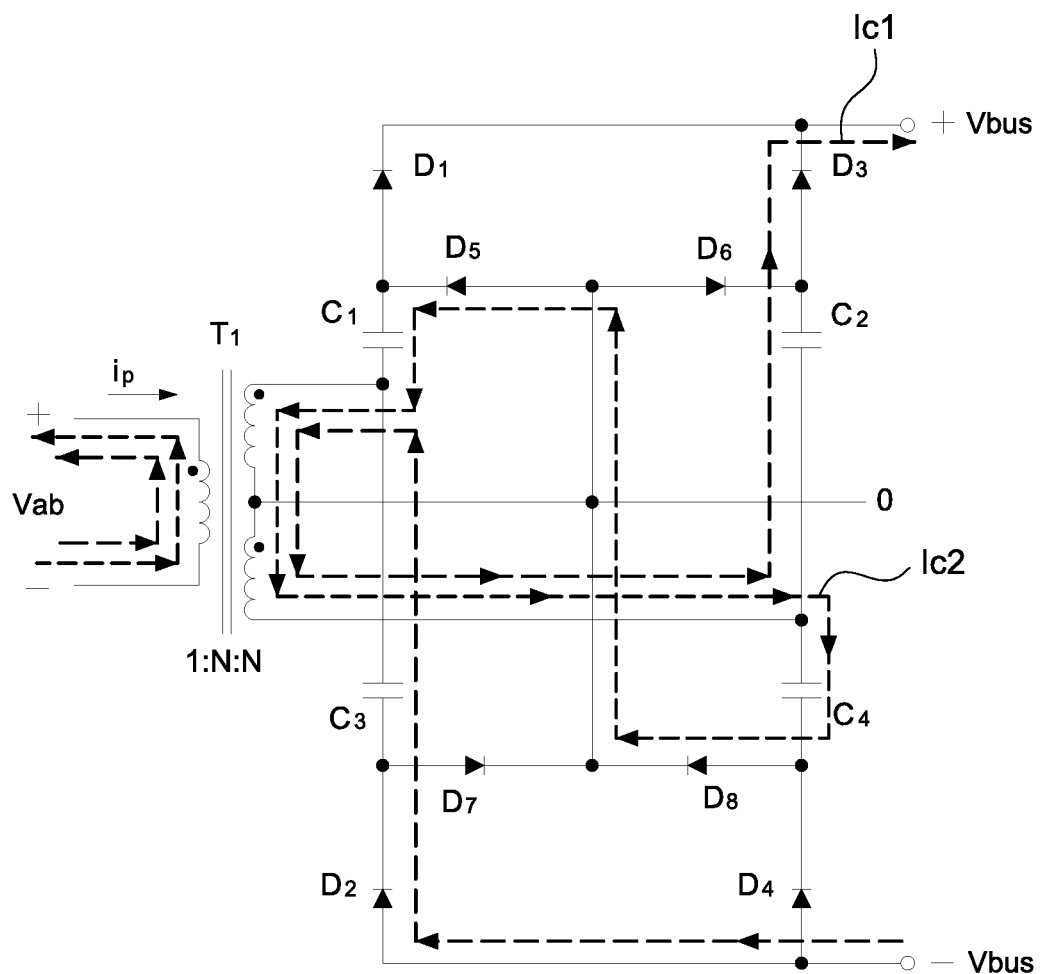
FIG. 11B is a schematic diagram of current paths of a third-quadrant operation in FIG. 10.

Please refer to FIG. 11B, which shows a schematic diagram of current paths of a third-quadrant operation in FIG. 10. When the isolated boost converter operates in the third quadrant, a main current Ic1 flows through the secondary side of the transformer T1, the second capacitor C2, the third diode D3, the DC positive output contact +Vbus, the DC negative output contact −Vbus, the second diode D2, the third capacitor C3, and the secondary side. At this condition, the secondary side of the transformer T1 are connected in series to the second capacitor C2 and the third capacitor C3 establish a high output voltage. In particular, the second capacitor C2 and the third capacitor C3 are equivalent to be connected in series since the second diode D2 and the third diode D3 are turned by forward bias voltages.

A pre-charge current Ic2 flows through the secondary side of the transformer T1, the fourth capacitor C4, an eighth diode D8, a fifth diode D5, the first capacitor C1, and the secondary side. The first capacitor C1 and the fourth capacitor C4 are charged by the pre-charge current Ic2. In particular, since the fifth diode D5 and the eighth diode D8 are turned on by forward bias voltages, the first capacitor C1 and the fourth capacitor C4 are equivalent to be connected in series.

Figure 12:
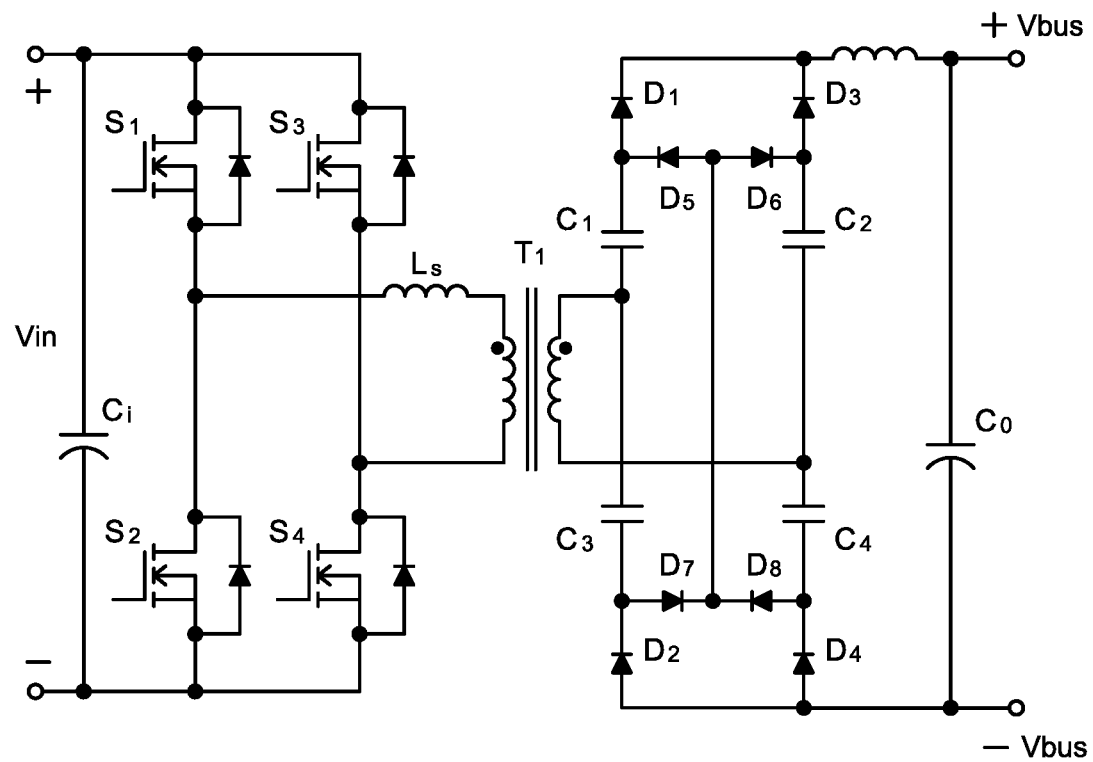
FIG. 12 is a circuit diagram of a full-bridge converter having the single-bus circuit structure of boosting voltage in FIG. 7.

Please refer to FIG. 12, which shows a circuit diagram of a full-bridge converter having the single-bus circuit structure of boosting voltage in FIG. 7. The symmetrical diode-capacitor circuit shown in FIG. 7 is applied to the full-bridge converter having the single-bus circuit structure to achieve the DC-to-DC converter with high boost ratio and high efficiency.

Moreover, the symmetrical diode-capacitor circuit shown in FIG. 9A and that shown in FIG. 9B are also applied to the full-bridge converter having the single-bus circuit structure (no detailed circuit diagram is shown).

Figure 13:
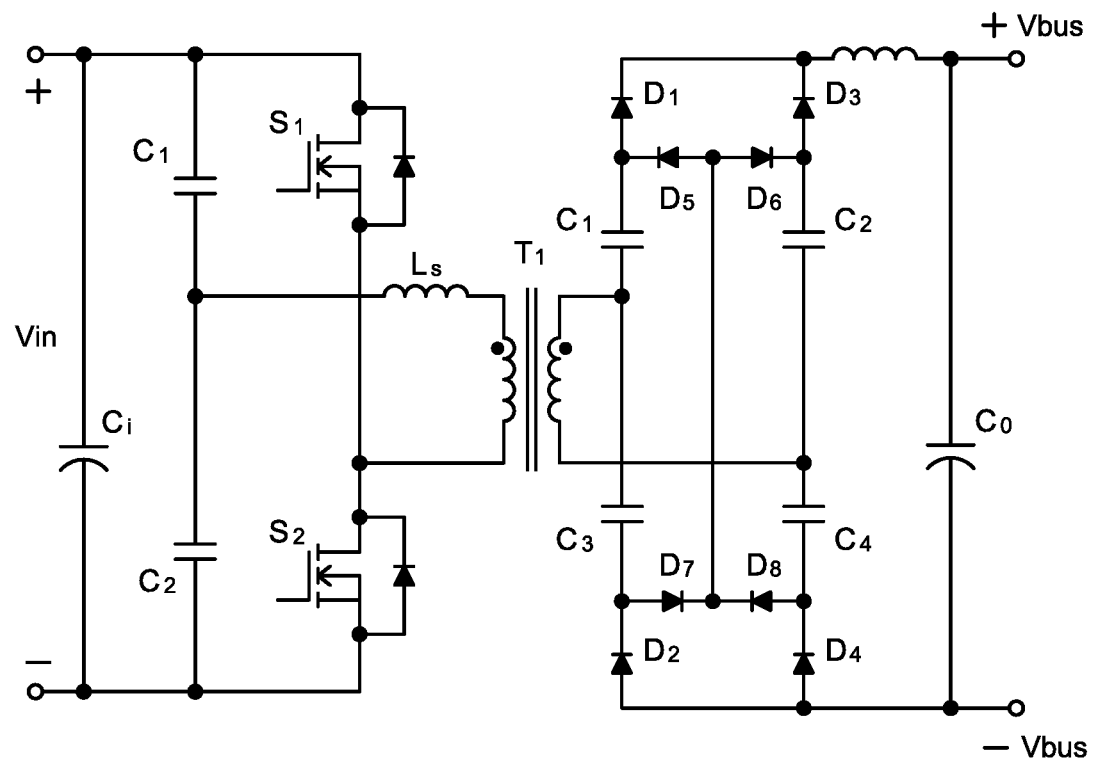
FIG. 13 is a circuit diagram of a half-bridge converter having the single-bus circuit structure of boosting voltage in FIG. 7.

Please refer to FIG. 13, which shows a circuit diagram of a half-bridge converter having the single-bus circuit structure of boosting voltage in FIG. 7. The symmetrical diode-capacitor circuit shown in FIG. 7 is applied to the half-bridge converter having the single-bus circuit structure to achieve the DC-to-DC converter with high boost ratio and high efficiency.

Moreover, the symmetrical diode-capacitor circuit shown in FIG. 9A and that shown in FIG. 9B are also applied to the half-bridge converter having the single-bus circuit structure (no detailed circuit diagram is shown).

Figure 14:
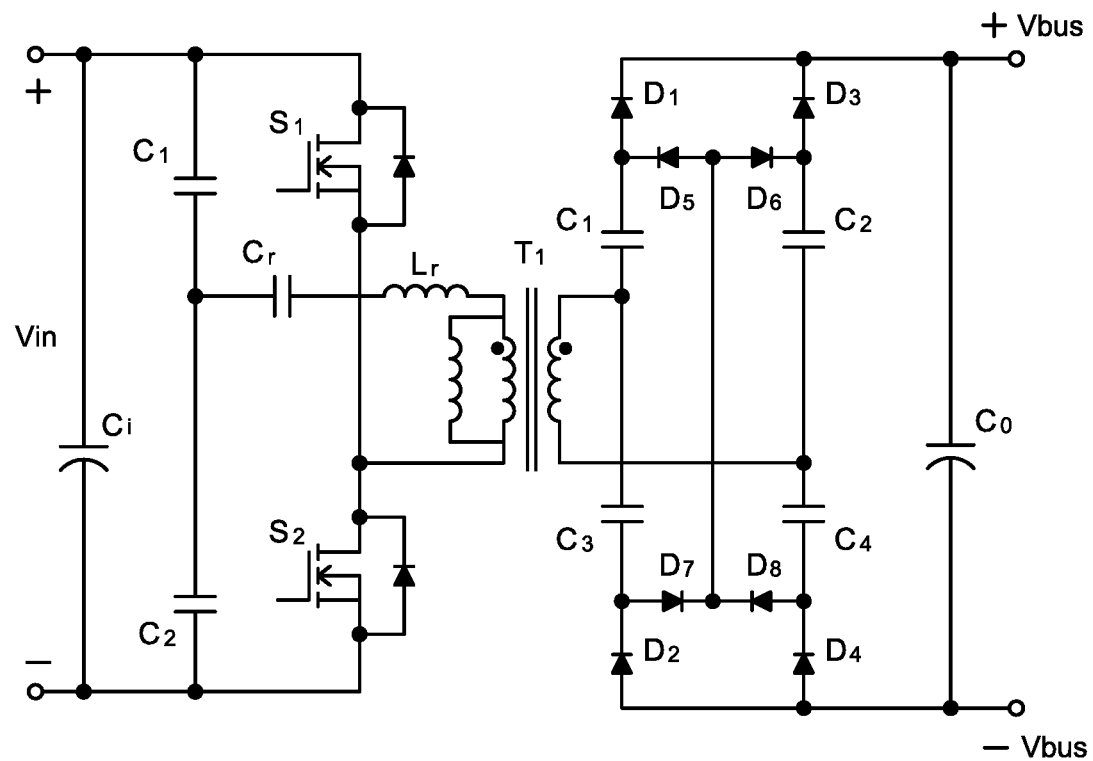
FIG. 14 is a circuit diagram of a half-bridge LLC resonant converter having the single-bus circuit structure of boosting voltage in FIG. 7.

Please refer to FIG. 14, which shows a circuit diagram of a half-bridge LLC resonant converter having the single-bus circuit structure of boosting voltage in FIG. 7. The symmetrical diode-capacitor circuit shown in FIG. 7 is applied to the half-bridge LLC resonant converter having the single-bus circuit structure to achieve the DC-to-DC converter with high boost ratio and high efficiency.

Moreover, the symmetrical diode-capacitor circuit shown in FIG. 9A and that shown in FIG. 9B are also applied to the half-bridge LLC resonant converter having the single-bus circuit structure (no detailed circuit diagram is shown).

Figure 15:
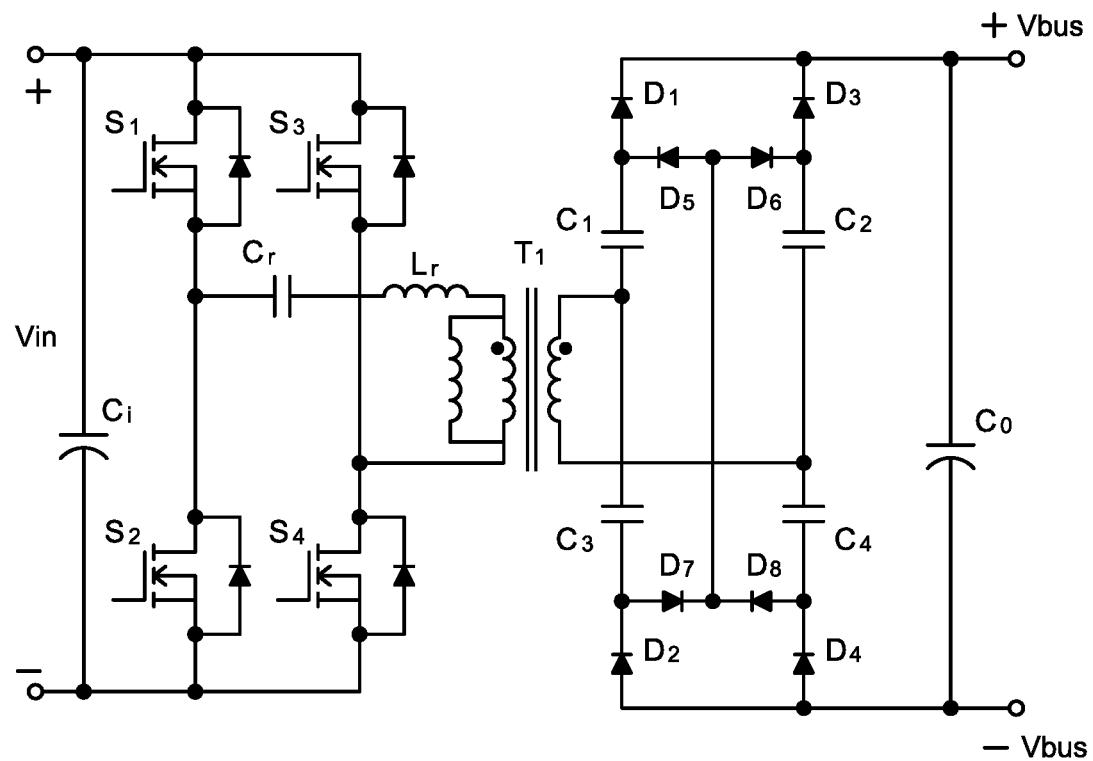
FIG. 15 is a circuit diagram of a full-bridge LLC resonant converter having the single-bus circuit structure of boosting voltage in FIG. 7.

Please refer to FIG. 15, which shows a circuit diagram of a full-bridge LLC resonant converter having the single-bus circuit structure of boosting voltage in FIG. 7. The symmetrical diode-capacitor circuit shown in FIG. 7 is applied to the full-bridge LLC resonant converter having the single-bus circuit structure to achieve the DC-to-DC converter with high boost ratio and high efficiency.

Moreover, the symmetrical diode-capacitor circuit shown in FIG. 9A and that shown in FIG. 9B are also applied to the full-bridge LLC resonant converter having the single-bus circuit structure (no detailed circuit diagram is shown).

Figure 16:
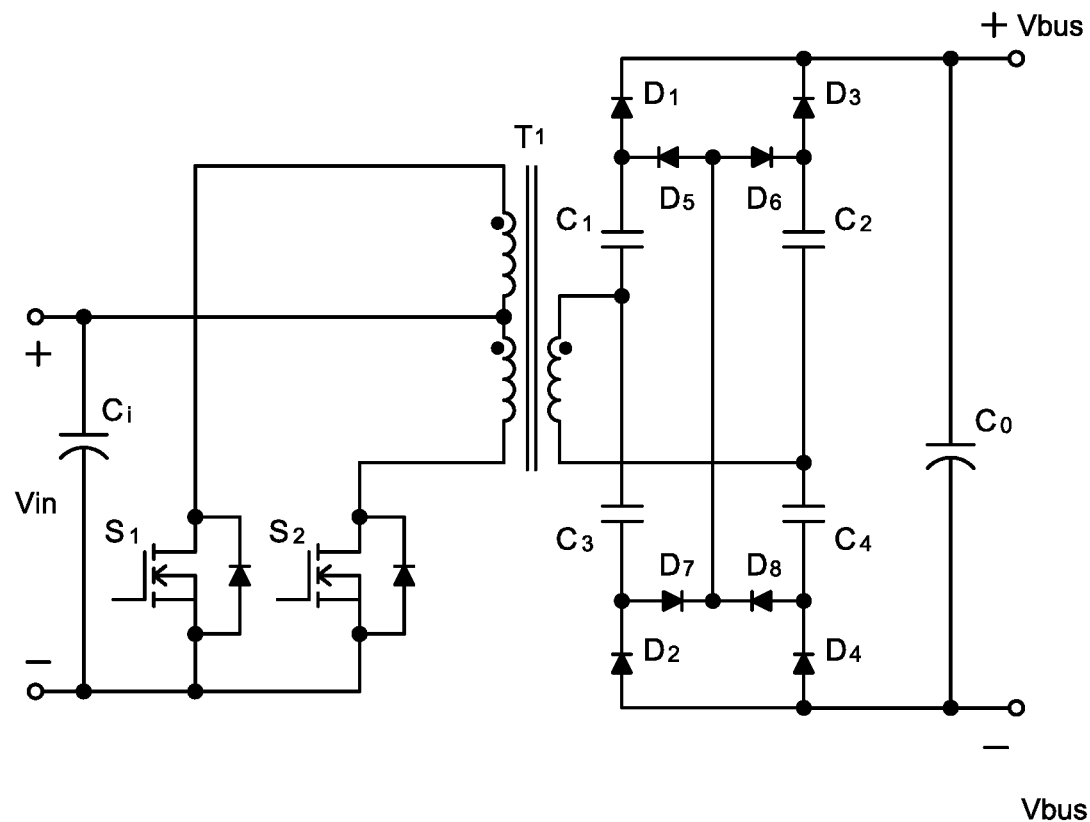
FIG. 16 is a circuit diagram of a push-pull converter having the single-bus circuit structure of boosting voltage in FIG. 7.

Please refer to FIG. 16, which shows a circuit diagram of a push-pull converter having the single-bus circuit structure of boosting voltage in FIG. 7. The symmetrical diode-capacitor circuit shown in FIG. 7 is applied to the push-pull converter having the single-bus circuit structure to achieve the DC-to-DC converter with high boost ratio and high efficiency.

Moreover, the symmetrical diode-capacitor circuit shown in FIG. 9A and that shown in FIG. 9B are also applied to the push-pull converter having the single-bus circuit structure (no detailed circuit diagram is shown).

Figure 17:
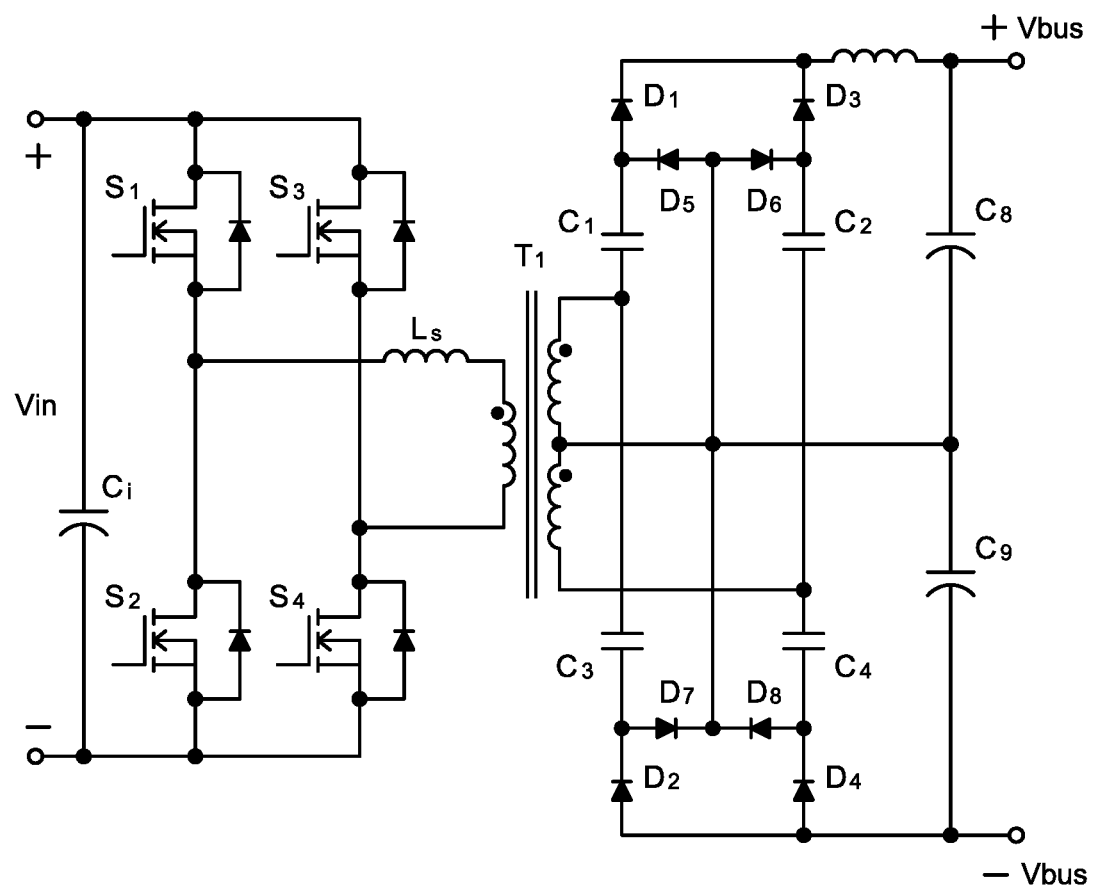
FIG. 17 is a circuit diagram of a full-bridge converter having the dual-bus circuit structure of boosting voltage in FIG. 10.

Please refer to FIG. 17, which shows a circuit diagram of a full-bridge converter having the dual-bus circuit structure of boosting voltage in FIG. 10. The symmetrical diode-capacitor circuit shown in FIG. 10 is applied to the full-bridge converter having the dual-bus circuit structure to achieve the DC-to-DC converter with high boost ratio and high efficiency.

Figure 18:
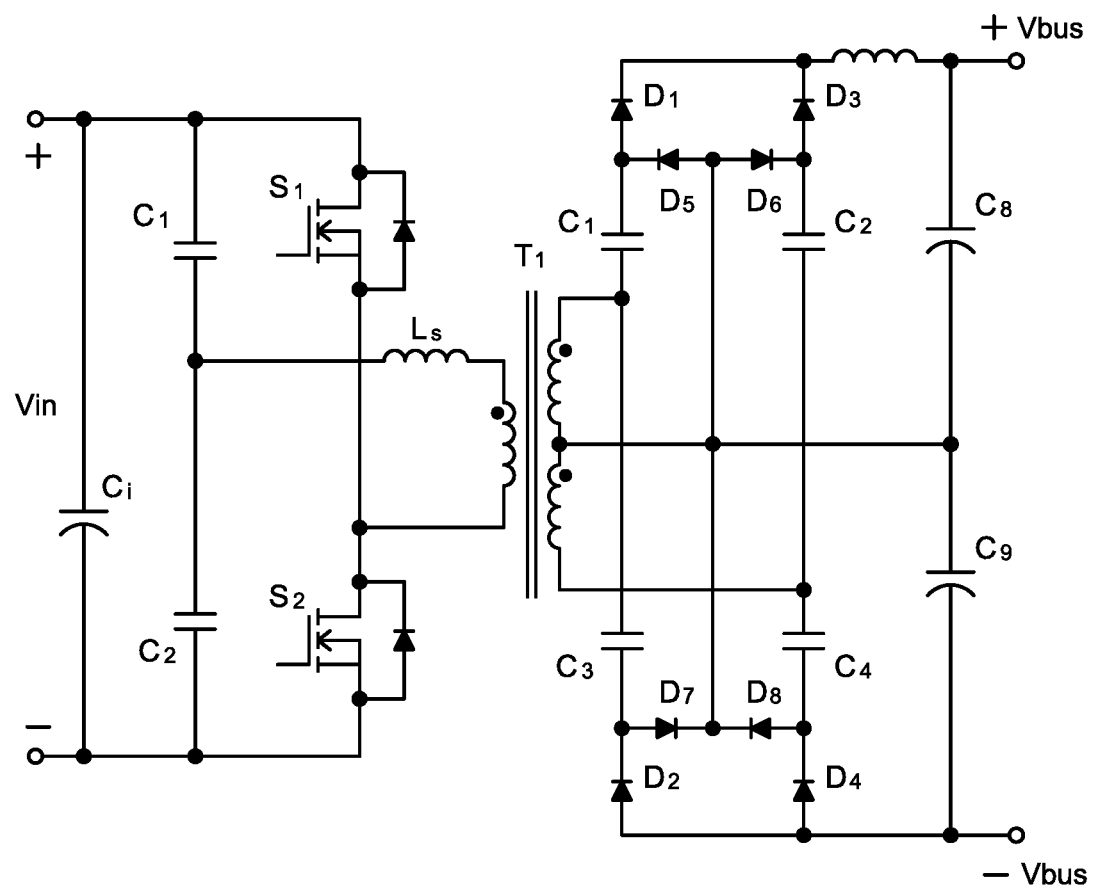
FIG. 18 is a circuit diagram of a half-bridge converter having the dual-bus circuit structure of boosting voltage in FIG. 10.

Please refer to FIG. 18, which shows a circuit diagram of a half-bridge converter having the dual-bus circuit structure of boosting voltage in FIG. 10. The symmetrical diode-capacitor circuit shown in FIG. 10 is applied to the half-bridge converter having the dual-bus circuit structure to achieve the DC-to-DC converter with high boost ratio and high efficiency.

Figure 19:
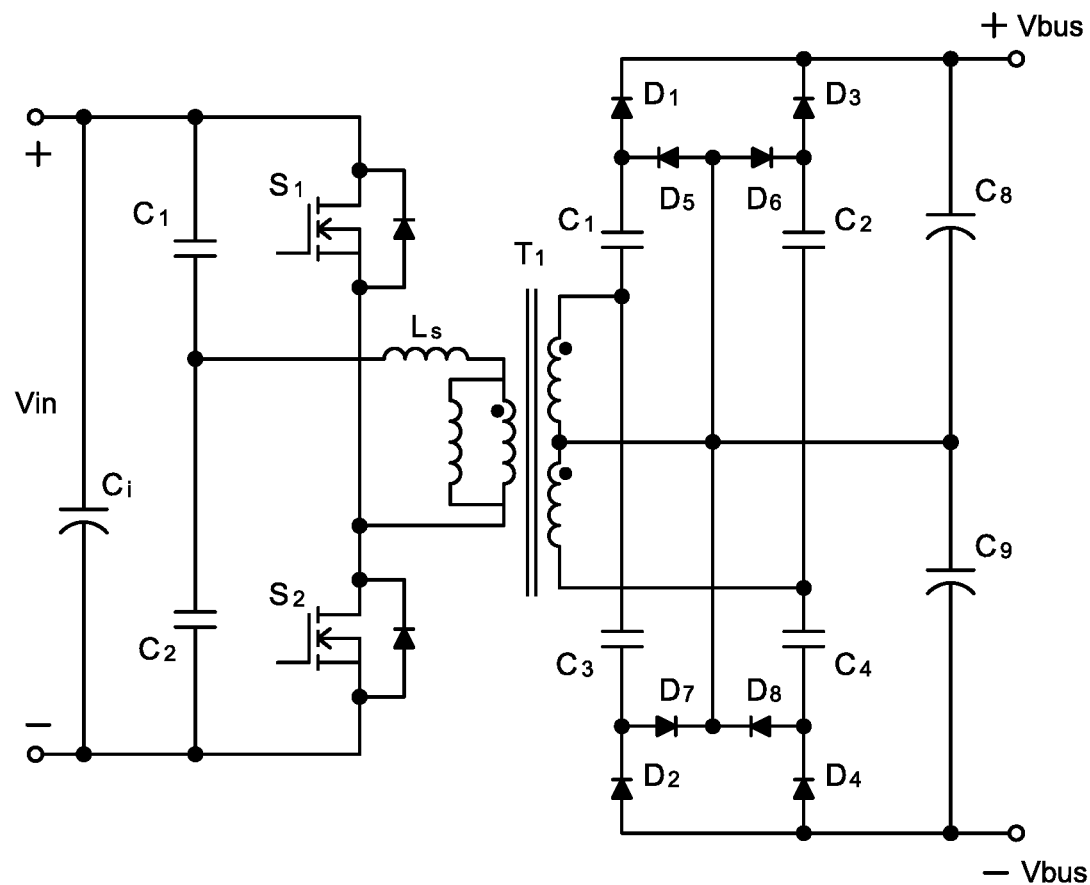
FIG. 19 is a circuit diagram of a half-bridge LLC resonant converter having the dual-bus circuit structure of boosting voltage in FIG. 10.

Please refer to FIG. 19, which shows a circuit diagram of a half-bridge LLC resonant converter having the dual-bus circuit structure of boosting voltage in FIG. 10. The symmetrical diode-capacitor circuit shown in FIG. 10 is applied to the half-bridge LLC resonant converter having the dual-bus circuit structure to achieve the DC-to-DC converter with high boost ratio and high efficiency.

Figure 20:
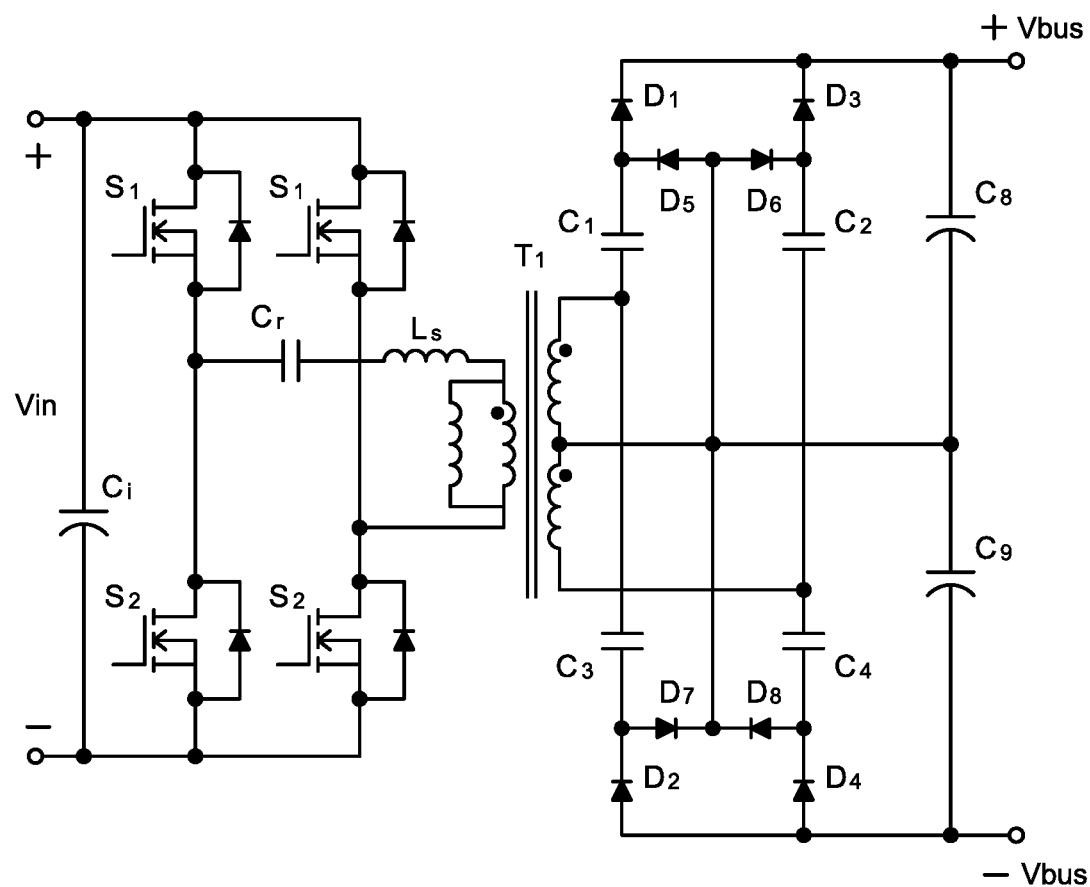
FIG. 20 is a circuit diagram of a full-bridge LLC resonant converter having the dual-bus circuit structure of boosting voltage in FIG. 10.

Please refer to FIG. 20, which shows a circuit diagram of a full-bridge LLC resonant converter having the dual-bus circuit structure of boosting voltage in FIG. 10. The symmetrical diode-capacitor circuit shown in FIG. 10 is applied to the full-bridge LLC resonant converter having the dual-bus circuit structure to achieve the DC-to-DC converter with high boost ratio and high efficiency.

Figure 21:
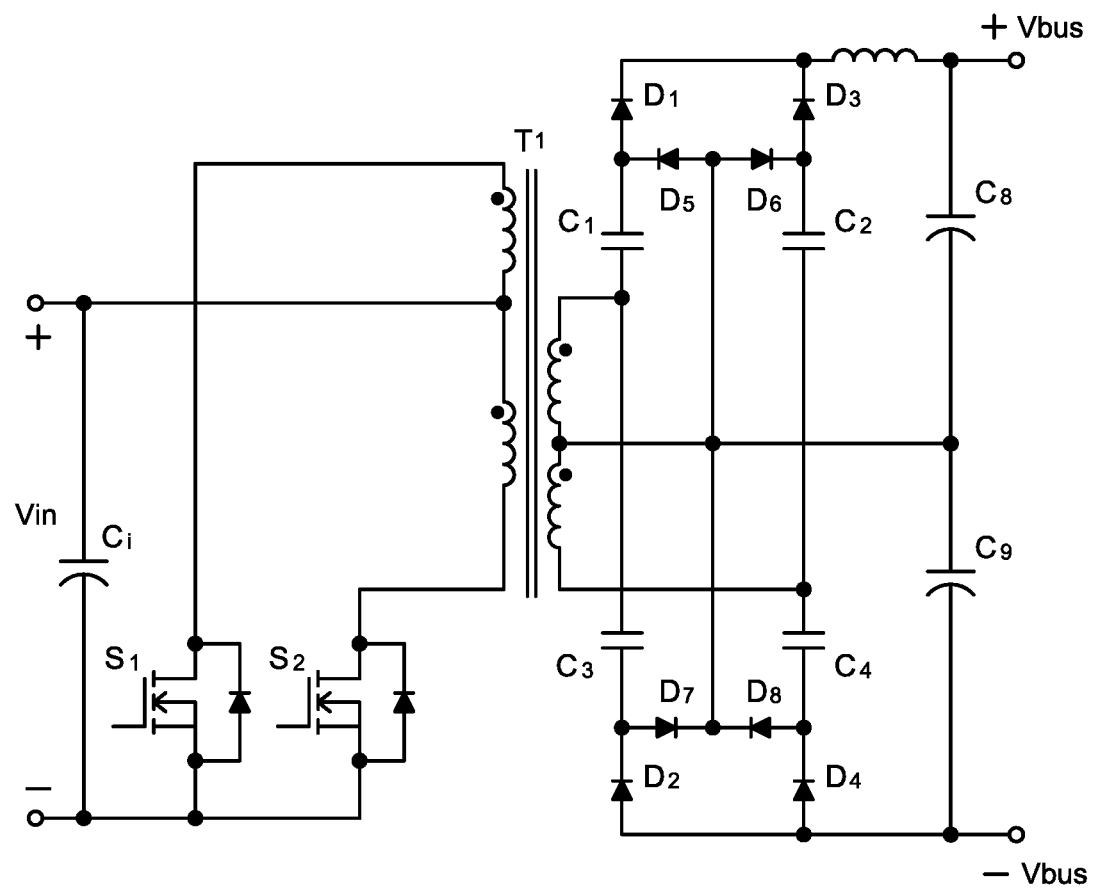
FIG. 21 is a circuit diagram of a push-pull converter having the dual-bus circuit structure of boosting voltage in FIG. 10.

Please refer to FIG. 21, which shows a circuit diagram of a push-pull converter having the dual-bus circuit structure of boosting voltage in FIG. 10. The symmetrical diode-capacitor circuit shown in FIG. 10 is applied to the push-pull converter having the dual-bus circuit structure to achieve the DC-to-DC converter with high boost ratio and high efficiency.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:
1. An isolated boost converter, comprising:
   a transformer comprising a secondary side having a secondary side first contact and a secondary side second contact,
   a first bridge arm having a first diode and a second diode; a cathode of the first diode coupled to a DC positive output contact, an anode of the first diode coupled to a first bridge arm upper contact, an anode of the second diode coupled to a DC negative output contact, and a cathode of the second diode coupled to a first bridge arm lower contact,
   a second bridge arm having a third diode and a fourth diode; a cathode of the third diode coupled to the DC positive output contact, an anode of the third diode coupled to a second bridge arm upper contact, an anode of the fourth diode coupled to the DC negative output contact, and a cathode of the fourth diode coupled to a second bridge arm lower contact, and
   a boost circuit, comprising:

a fifth diode and a sixth diode, anodes of the fifth diode and the sixth diode mutually coupled to a first contact and cathodes of the fifth diode and the sixth diode coupled to the first bridge arm upper contact and the second bridge arm upper contact, respectively, a seventh diode and an eighth diode, cathodes of the seventh diode and the eighth diode mutually coupled to a second contact and anodes of the seventh diode and the eighth diode coupled to the first bridge arm lower contact and the second bridge arm lower contact, respectively, and the second contact directly connected to the first contact, and at least two capacitors, coupled to the secondary side first contact and the secondary side second contact;

wherein the number of the at least two capacitors is four, including a first capacitor, a second capacitor, a third capacitor, and a fourth capacitor, wherein two ends of the first capacitor are coupled to the secondary side first contact and the first bridge arm upper contact, two ends of the second capacitor are coupled to the secondary side second contact and the second bridge arm upper contact, two ends of the third capacitor are coupled to the secondary side first contact and the first bridge arm lower contact, and two ends of the fourth capacitor are coupled to the secondary side second contact and the second bridge arm lower contact.

2. The isolated boost converter in claim 1, wherein when the isolated boost converter operates in a first quadrant, a main current flows through the secondary side, the first capacitor, the first diode, the DC positive output contact, the DC negative output contact, the fourth diode, the fourth capacitor, and the secondary side, a pre-charge current flows through the secondary side, the third capacitor, the seventh diode, the sixth diode, the second capacitor, and the secondary side.

3. The isolated boost converter in claim 1, wherein when the isolated boost converter operates in a third quadrant, a main current flows through the secondary side, the second capacitor, the third diode, the DC positive output contact, the DC negative output contact, the second diode, the third capacitor, and the secondary side, a pre-charge current flows through the secondary side, the fourth capacitor, the eighth diode, the fifth diode, the first capacitor, and the secondary side.

4. The isolated boost converter in claim 1, wherein the secondary side of the transformer further comprises a center-tapped contact, the second contact directly connected to the center-tapped contact.

5. The isolated boost converter in claim 4, wherein when the isolated boost converter operates in a first quadrant, a main current flows through the secondary side, the first capacitor, the first diode, the DC positive output contact, the DC negative output contact, the fourth diode, the fourth capacitor, and the secondary side, a pre-charge current flows through the secondary side, the third capacitor, the seventh diode, the sixth diode, the second capacitor, and the secondary side.

6. The isolated boost converter in claim 4, wherein the isolated boost converter operates in a third quadrant, a main current flows through the secondary side, the second capacitor, the third diode, the DC positive output contact, the DC negative output contact, the second diode, the third capacitor, and the secondary side, a pre-charge current flows through the secondary side, the fourth capacitor, the eighth diode, the fifth diode, the first capacitor, and the secondary side.

7. An isolated boost converter, comprising:

a transformer comprising a secondary side having a secondary side first contact and a secondary side second contact, a first bridge arm having a first diode and a second diode; a cathode of the first diode coupled to a DC positive output contact, an anode of the first diode coupled to a first bridge arm upper contact, an anode of the second diode coupled to a DC negative output contact, and a cathode of the second diode coupled to a first bridge arm lower contact, a second bridge arm having a third diode and a fourth diode; a cathode of the third diode coupled to the DC positive output contact, an anode of the third diode coupled to a second bridge arm upper contact, an anode of the fourth diode coupled to the DC negative output contact, and a cathode of the fourth diode coupled to a second bridge arm lower contact, and a boost circuit, comprising:
a fifth diode and a sixth diode, anodes of the fifth diode and the sixth diode mutually coupled to a first contact and cathodes of the fifth diode and the sixth diode coupled to the first bridge arm upper contact and the second bridge arm upper contact, respectively, a seventh diode and an eighth diode, cathodes of the seventh diode and the eighth diode mutually coupled to a second contact and anodes of the seventh diode and the eighth diode coupled to the first bridge arm lower contact and the second bridge arm lower contact, respectively, and the second contact directly connected to the first contact, and at least two capacitors, coupled to the secondary side first contact and the secondary side second contact;

wherein the number of the at least two capacitors is two, including a first capacitor and a second capacitor, wherein two ends of the first capacitor are coupled to the secondary side first contact and the first bridge arm upper contact, two ends of the second capacitor are coupled to the secondary side second contact and the second bridge arm upper contact; the secondary side first contact is coupled to the first bridge arm lower contact, the secondary side second contact is coupled to the second bridge arm lower contact;

wherein when the isolated boost converter operates in a first quadrant, a main current flows through the secondary side, the first capacitor, the first diode, the DC positive output contact, the DC negative output contact, the fourth diode, and the secondary side, a pre-charge current flows through the secondary side, the seventh diode, the sixth diode, the second capacitor, and the secondary side.

8. The isolated boost converter in claim 7, wherein when the isolated boost converter operates in a third quadrant, a main current flows through the secondary side, the second capacitor, the third diode, the DC positive output contact, the DC negative output contact, the second diode, and the secondary side, a pre-charge current flows through the secondary side, the eighth diode, the fifth diode, the first capacitor, and the secondary side.

9. An isolated boost converter, comprising:
- a transformer comprising a secondary side having a secondary side first contact and a secondary side second contact,
- a first bridge arm having a first diode and a second diode; a cathode of the first diode coupled to a DC positive output contact, an anode of the first diode coupled to a first bridge arm upper contact, an anode of the second diode coupled to a DC negative output contact, and a cathode of the second diode coupled to a first bridge arm lower contact,
- a second bridge arm having a third diode and a fourth diode; a cathode of the third diode coupled to the DC positive output contact, an anode of the third diode coupled to a second bridge arm upper contact, an anode of the fourth diode coupled to the DC negative output contact, and a cathode of the fourth diode coupled to a second bridge arm lower contact, and
- a boost circuit, comprising:
  - a fifth diode and a sixth diode, anodes of the fifth diode and the sixth diode mutually coupled to a first contact and cathodes of the fifth diode and the sixth diode coupled to the first bridge arm upper contact and the second bridge arm upper contact, respectively,
  - a seventh diode and an eighth diode, cathodes of the seventh diode and the eighth diode mutually coupled to a second contact and anodes of the seventh diode and the eighth diode coupled to the first bridge arm lower contact and the second bridge arm lower contact, respectively, and the second contact directly connected to the first contact, and
  - at least two capacitors, coupled to the secondary side first contact and the secondary side second contact;
- wherein the number of the at least two capacitors is two, including a third capacitor and a fourth capacitor,
  - wherein two ends of the third capacitor are coupled to the secondary side first contact and the first bridge arm lower contact, two ends of the fourth capacitor are coupled to the secondary side second contact and the second bridge arm lower contact; the secondary side first contact is coupled to the first bridge arm upper contact, the secondary side second contact is coupled to the second bridge arm upper contact,
  - wherein when the isolated boost converter operates in a first quadrant,
- a main current flows through the secondary side, the first diode, the DC positive output contact, the DC negative output contact, the fourth diode, the fourth capacitor, and the secondary side,
- a pre-charge current flows through the secondary side, the third capacitor, the seventh diode, the sixth diode, and the secondary side.

10. The isolated boost converter in claim 9, wherein when the isolated boost converter operates in a third quadrant,
- a main current flows through the secondary side, the third diode, the DC positive output contact, the DC negative output contact, the second diode, the third capacitor, and the secondary side,
- a pre-charge current flows through the secondary side, the fourth capacitor, the eighth diode, the fifth diode, and the secondary side.

* * * * *